March 16, 1948.                   A. WRIGHT                    2,437,924
                    LIGHT-SENSITIVE ELEMENT FOR COLOR PHOTOGRAPHY
                              Filed July 27, 1944

INVENTOR
Arthur Wright

Patented Mar. 16, 1948

2,437,924

UNITED STATES PATENT OFFICE 2,437,924

LIGHT-SENSITIVE ELEMENT FOR COLOR PHOTOGRAPHY

Arthur Wright, Forest Hills, N. Y., assignor to Keller-Dorian Colorfilm Corporation, New York, N. Y., a corporation of Delaware Application July 27, 1944, Serial No. 546,760

7 Claims. (Cl. 95—2)

My invention relates to means whereby pictures in colors may be photographed, copied and projected, both for still pictures and motion pictures, and it relates also to the apparatus, including a film used therewith.

The object of my invention is to provide a system of photographing in colors, by means of which the colors may be faithfully and accurately photographed, copied and projected, whether in the form of still pictures or motion pictures, and which may be, nevertheless, carried out with a procedure and apparatus, as well as a film, that are simple in character and, therefore, comparatively inexpensive, both in the production of the apparatus and film as well as in the labor required to produce the pictures. Hitherto goffered film pictures have been made which have had the advantage of very accuracy in the colors reproduced, as well as in the comparative cheapness of the apparatus and film, in the low cost of the labor involved, and speed in producing the pictures. Such goffered film pictures, however, have the disadvantage of requiring the use of a multi-zone color filter in the camera and projector, and it has not always been possible to provide such numerous color filters, needed in distribution with a given picture, with invariably the same shades of the three colors used in the respective color filters. Besides, the use of a color filter has not only been an added expense, but ofttimes required an adjustment of the diaphragm areas of the different zones in the filters of the projectors and cameras, and also required the standard projectors to be modified in other respects to the extent necessary to adapt them to the use of these color filters. Also, the multi-zone color filters have unavoidably injected into the goffered film system of color photography, as previously known, the necessity of avoiding color dominants, etc., which required the presence of collimating lenses or collimated objectives, and because of the parallax caused by the color zones of the color filter, such method of photography has previously also required the presence of light splitters in connection with the objective to prevent fringing of the colors due to the parallax. Such anti-fringers required the inclusion therein of numerous prisms or mirrors, resulting in a considerable loss of light. Furthermore, there have been distinct disadvantages in goffered films previously, owing to the necessity of accurately placing the multi-zone color filter and the diaphragm optically with regard to the collimating lens or collimated objective and with regard to the film, both in the taking and projection of pictures. Furthermore, in the other or non-goffered systems of color photography, where separate different color images were required, there was a resultant lack of definition due either to the smallness of the image or lack of registry or both and where multi-layer films were used, as in the subtractive method, an elaborate, slow and costly technique was required and in which the colors were arbitrary to a considerable extent due to the necessity of using dyestuffs or dye generating chemicals; or it was necessary to produce beforehand, in the film, color screens of dyed areas of microscopic size, which caused very great loss of light and were inaccurate as well as expensive, especially in the case of plural-colored starch grains, as they could not be uniformly mixed and distributed on the film.

In accordance with my invention I have provided a color film system in which all the above disadvantages are obviated. In other words, in carrying out my system it is unnecessary to use color filters, collimating lenses, anti-fringers, plural images, subtractive multi-layer films, dyestuffs, etc., although any of these can be used if desired.

While my invention is capable of being carried out in many different ways, for the purpose of illustration I shall describe only certain ways of carrying out the same hereinafter, and have shown in the accompanying drawings only certain kinds of films in apparatus adapted to be used in connection therewith, in which—

In carrying out my invention I may use any of the many different known types of apparatus for photographing, copying and projecting goffered or non-goffered film pictures, although it is to be understood that the color filters used in photographing and projecting such pictures may be omitted. Furthermore, the collimating lenses as used with goffered film pictures may also be omitted if desired, although they may be retained if desired, and the anti-fringers may likewise be omitted as unnecessary, although they could, of course, be employed if desired. In copying, any of the known ways of copying pictures may be employed, although in the case of goffered films I may use any of the systems of copying by contact or projection, and in connection with which it will be understood that any of the many different types of devices may be employed which are adapted to avoid moiré effects, although such devices are not necessary in connection with the films herein described.

Figure 1:
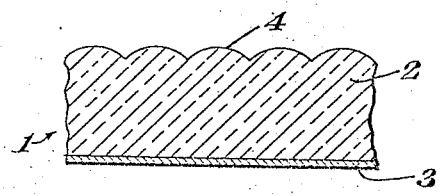
Fig. 1 is a longitudinal transverse section through a goffered film embodiment containing two layers, made in accordance with my invention.

In photographing, for example in the making of motion pictures with any of the known types of apparatus as above referred to, I may utilize a goffered film 1 which may be goffered in the form of picots or cylindrical lenses running transversely of the film, as shown in Fig. 1, or longitudinally thereof, or at any other angle to the edge of the film. The gofferings may be of any desired size, but preferably have a width of 1/22 of a millimeter. The film 1 may be comprised of the usual goffered support layer 2 of cellulose nitrate or cellulose acetate, etc., having generally a thickness approximately three times the radius of the goffering, although these dimensions may be varied in any desired way, and applied to the rear surface of the film there is the usual light sensitive emulsion layer 3, which may be of the usual thickness of .015 to .04 millimeter, but which is preferably thinner, that is to say having a thickness of .005 to .008 millimeter, comprising a body of gelatine and containing any of the usual well known silver halide salts, as, for example, silver bromide, as well as any of the other constituents used in making photographic light sensitive films, for instance sensitizers provided for making the film panchromatic. In the said emulsion or in the support layer or both, there is contained a dichroic or pleochroic substance, colored or colorless, that is to say a substance which exhibits different colors to polarized transmitted light according to the particular plane in the substance which is parallel to the plane of vibration of the polarized light. As such substance I prefer to use cymophane, $BeAl_2O_4$, which may be the artificial variety, which is colorless or very often green, or the alexandrite variety thereof, which may be made artificially in the form of crystals, made, for example, as described in Friend, Inorganic Chemistry, 1926, vol. 3, part 2, page 30; also in Ebelman, Ann. Chim. Phys., 1851 (3) 33, et seq.; Ann. de Chemie et de Phys., v. XIII, page 329 et seq.; Compt. Rend., 25, 279 et seq.; Deville and Caron, Compt. Rend., 46, 764 et seq.; Jorgensen, Jour. Prakt. Chemie (2), 14, 230 et seq.; Zeiss Nachrichten, 2 Folge, Heft 2, 1936, page 60 et seq.; Hautefeuille and Perry, Compt. Rend., 1888, 106, 34 et seq.; Doelter and Leitmeyer, v. 3, pt. 2, page 513; Kraus, Gems and Gem Materials, 1931, page 163 et seq.; Dana, Mineralogy, 1899, page 342, and 1914, page 230, which is inexpensive to make, and the crystals of which may be colorless in ordinary light but in which the "colorless crystals" are "vividly colored" in polarized light; Compt. Rend., 106, 489, and in which, according to Dana, ibid., the pleochroic colors are "orange-yellow," "emerald-green" and "columbine-red." This corresponds optically to the natural variety thereof known under the name of chrysoberyl. Instead there may be used, if desired, any other dichroic or pleochroic substance, as, for example, varieties of zircon, $ZrSiO_4$, or, instead, varieties of tourmaline. For this purpose I prefer to use, however, cymophane, and which may be in the form of crystals, but preferably in the form of broken fragments of crystals of very small size and preferably having a diameter ranging from .005 to .0025 millimeter, or even smaller, down to the size of the smallest silver grain in the emulsion, which is .002 millimeter in diameter, the complete or crushed crystals of cymophane being sifted, preferably, to a range of diameters such as those just referred to. An amount of the dichroic or pleochroic substance, as, for example, cymophane, is introduced into the emulsion or in the support layer just sufficient or slightly more than sufficient so that substantially each ray of light will be intercepted by a fragment of cymophane. For example, where the thickness of the layer 3 is .015 millimeter and the size of the fragments of cymophane is 1/200 or .005 millimeter, there will be introduced in the liquid emulsion 3, before being applied to the support 2, a weight of the cymophane substantially equal to the weight of the silver halide, such, for example, as silver bromide, present in the emulsion, although the amount of this may be greatly increased up to an amount double the weight of the silver halide or lessened, if desired. Cymophane made artificially as above, is transparent, has a white streak by reflected light, is brittle, has several different planes of cleavage which are generally moderately distinct, the fracture of the crystals is uneven to concoidal, and the lustre is vitreous. It is pleochroic, that is to say transmitted light polarized in a given plane is emerald green when parallel to one plane therein, orange-yellow when parallel to another plane therein, and columbine-red when parallel to still a different plane therein, Dana, ibid. These colors are even visible to the naked eye in the artificial alexandrite, Kraus, ibid. In other words, the crystals or fragments thereof break up white light into its different color components and the different polarized color beams take different courses due to the refraction, etc., and the varying position of the cymophane particles, and any lack of uniformity in this respect in a single image is compensated for by the angularity of the light received from the gofferings, and in the motion pictures by the successive differences in the successive image areas exhibited in the usual way many times per second. Furthermore, there will not be the loss of light produced by processes using filters or color screen films as the same particle of cymophane can, to some extent, transmit different colors due to the different planes of the polarized beams therein and the different angles of these transmitted beams.

The light, in passing from the objective in the camera to the film 1, which is located in the focal plane of the objective, will first pass through the transverse cylindrical gofferings 4 of the film and at that point, due to reflection and refraction, will become partly polarized. In other words, part of the light vibrating in the direction of the reflecting plane at the surface of the goffering will be reflected, leaving, for passage into the support layer, all of the light vibrating at right angles to the gofferings and some of the light vibrating in the same direction as the light reflected. In other words the light is very largely polarized when it enters the support layer 2. The said light continues into the other layer or layers including the emulsion layer 3, where it is again partly polarized in a similar manner so that the light which enters the emulsion layer 3 is thus substantially polarized. As this light enters the emulsion layer 3, or the other layer containing cymophane herein referred to, it will encounter the particles of cymophane which are carried therein at every conceivable angle, and in general the light will, after passing through the particles of cymophane, enter a particle or crystal of silver halide, the particles being scattered at different levels and laterally in the emulsion, to become photographically registered thereby. Inasmuch as a particular part of an object photographed will have its light coming into the camera projected onto a single goffering at the many different angles at which the goffering transmits the light from said point onto the sensitive layer 3 back of the goffering, the given part of the object will have its polarized light in a given plane photographed at a succession of different points by differently placed particles of cymophane back of the goffering by means of the light coming into the particular goffering at many different angles from said part of the object photographed, and the light converged by a single goffering from a given part of the object onto a single point back of the goffering in the emulsion will be polarized into the same plane by the goffering surface notwithstanding the convergence of the lenticle. Also, the series of beams of light coming from the said part of the object and registered back of a particular goffering encounter the particles of cymophane in the emulsion layer back of the goffering and thus pass through the cymophane at all conceivable angles, not only due to the various angles at which the particles of cymophane happen to be positioned, but also due to the different angles of the light back of the goffering, and in this way substantially all the color components of the light from the particular point of the object become photographed by means of a succession of different colors like white light back of the particular goffering. The film can be developed in any desired way, but is preferably developed by the process of reversal, so that when the film picture is projected the actual color transmitted through a given particle of cymophane by a particular one of the light beams will be projected through the projector, which may be of any desired type, onto the theatre screen, due to reversibility of light paths. In projecting, the goffered side, or the emulsion side, may face the source of projected light, which is preferably diffused. There will be little or no tendency to form moiré effects in copying, as the light from the particles will tend to bridge the lines between the gofferings.

Figure 2:
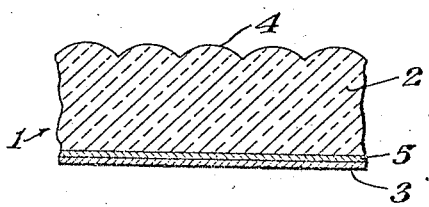
Fig. 2 is a similar section of a modified form of a goffered film containing three layers, adapted to be used in my invention.

If desired, instead of placing the cymophane particles in the emulsion layer 3, or the support layer 2, they may be contained in a separate layer 5, as shown in Fig. 2, above the emulsion layer 3, the layer 5 being a collodion layer, if desired.

Furthermore, if desired, either the layer 3 or the layer 5, or in fact any of the layers mentioned herein, may contain any sensitizing dyestuff, as, for example, that customarily used in producing panchromatic films, to decrease the sensitivity of the emulsion for the more actinic light rays, and so as to produce white with the colors of the pleochroic substance, if colored light is produced as a whole by the latter. For instance, if the cymophane is a pale green, a complementary or any other known sensitizer, as in Wall, Three Color Photography, 1925, page 255, et seq., can be introduced into the emulsion layer so as to reproduce white light.

Figure 3:
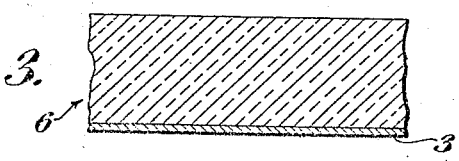
Fig. 3 is a similar view of a non-goffered film made in accordance with my invention, containing two layers.
Figure 4:
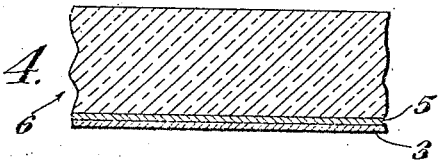
Fig. 4 is a like view showing a non-goffered film of three layers.
Figure 5:
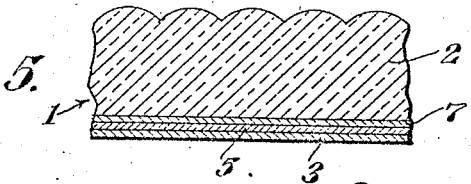
Fig. 5 is a view like Fig. 2 but containing four layers, with the polarizing material in a separate layer from the color forming layer and the emulsion layer.

It will furthermore be understood that, if desired, as shown in Figs. 3 and 4, the polarizing of the light in the camera and in the projector, as well as the copying machine, may be carried out by using a plain film 6 without gofferings, in which event the separation of the color registrations on the film is obtained by the polarization due to reflection and refraction from the film layers.

Also, in the film, with or without gofferings on the support layer, there may be introduced into any layer with or without the cymophane, a quantity of particles of any polarizing agent, such, for example, as calcite or Iceland spar, the particles of which latter may be preferably about the same size as the particles of cymophane and the quantity of which by weight may be any desired amount, but preferably about the same weight as the quantity of cymophane. It will be understood that the said cymophane and calcite may be in the same layer with the light sensitive emulsion or they might be in a layer between the said emulsion and the support; or that the film may be comprised of the support layer 2, a layer of the calcite crystal particles in collodion or gelatine 7, a layer of the cymophane particles in collodion or gelatine, and the light sensitive silver halide emulsion 3 in collodion or gelatine, arranged in the order named. The support layers in any of these forms can be goffered or not, as desired. The calcite may be present in sufficient quantity to prevent any substantial amount of light passing through any interstices between them. The calcite has the property of dividing the incoming light, which enters any one of its faces, into two planes which are polarized at right angles to each other, which rays also take a different angular course in the particles of calcite. As a result there is produced by the particles of calcite two different polarized rays having different angles of transmission which provide an opportunity for further dividing the light, and which become transformed into differently colored rays by passing through the cymophane and particles of light sensitive silver halide for the respective colors produced thereby. In projecting and copying the pictures with these or any of the above mentioned films or where the cymophane, with or without the presence of calcite, is located in a separate layer between the light sensitive emulsion and the light, the projection could be carried out by placing the film with the emulsion layer away from the source of light or otherwise. The calcite particles, because of the different courses of the light produced thereby, when in the separate layer 7, or when in the same layer with the cymophane, will tend to compensate for any residual interstices between the cymophane particles, although the latter, with or without the presence of the calcite particles, will also tend to overcome the interstices, if any are present, by reason of the manifold courses of the rays of light due to the successive projection of the images on the theatre screen. Where the cymophane or calcite, or both, are not in the emulsion layer they could be applied in the solution of the collodion or gelatine layers when the latter are applied, or they could be applied by dusting them over the surface made tacky by applying a gelatine or collodion solution, if desired. In all of the above modifications of the invention some polarizing effect is obtained also by reason of the passage of the light through the large number of small particles of the solid materials in the transparent medium, which, of course, aids in the separation of the colors produced by the polarizing effects.

All of the films thus produced have a high degree of transparency as each thin crystal or particle of the color producing substance, such as cymophane, will be capable of transmitting the several different colors according to the plane of polarization and angles of incidence of the light rays thereon.

While I have described my invention above in detail I wish it to be understood that many changes may be made therein without departing from the spirit of the same.

I claim:

1. A device for obtaining multicolor pictures comprising a film having therein a transparent support and, accessible to a beam of transmitted light, both a layer of a light sensitive substance and, in light transmitting relationship to said substance between the support and the light sensitive substance, a layer of heterogeneously arranged substantially uniformly distributed fine closely adjacent particles of a pleochroic material in a substantially single particle thickness which exhibits orange, green and red colors, respectively, to polarized transmitted light according to the particular plane in the substance which is parallel to the plane of vibration of the polarized light.

2. A device for obtaining multicolor pictures comprising a film having therein a transparent support and, accessible to a beam of transmitted light, both a layer of a light sensitive substance and, in light transmitting relationship to said substance between the support and the light sensitive substance, a layer of heterogeneously arranged substantially uniformly distributed fine closely adjacent particles of a pleochroic material in a substantially single particle thickness which exhibits orange, green and red colors, respectively, to polarized transmitted light according to the particular plane in the substance which is parallel to the plane of vibration of the polarized light, said film having a goffered surface in said support in light focusing relationship to said substance.

3. A device for obtaining multicolor pictures comprising a film having therein a transparent support, and both a layer of a light sensitive substance and, in light transmitting relationship to said substance between the support and the light sensitive substance, a layer of heterogeneously arranged substantially uniformly distributed fine very small closely adjacent particles of cymophane in a substantially single particle thickness, adapted to exhibit different colors in different planes, respectively, from transmitted polarized white light.

4. A device for obtaining multicolor pictures comprising a film having therein a transparent support, and both a layer of a light sensitive substance and, in light transmitting relationship to said substance between the support and the light sensitive substance, a layer of heterogeneously arranged substantially uniformly distributed fine very small closely adjacent particles of cymophane in a substantially single particle thickness, adapted to exhibit different colors in different planes, respectively, from transmitted polarized white light, said film having a goffered surface.

5. A device for obtaining multicolor pictures comprising a film having therein a transparent support and, accessible to a beam of transmitted light, both a layer of a light sensitive substance and, in light transmitting relationship to said substance between the support and the light sensitive substance, a layer of heterogeneously arranged substantially uniformly distributed fine closely adjacent particles of a pleochroic material in a substantially single particle thickness which exhibits orange, green and red colors, respectively, to polarized transmitted light according to the particular plane in the substance which is parallel to the plane of vibration of the polarized light, said material being located in a layer between the light sensitive layer and the remainder of the film.

6. A device for obtaining multicolor pictures comprising a film having therein a transparent support and, accessible to a beam of transmitted light, both a layer of a light sensitive substance and, in light transmitting relationship to said substance between the support and the light sensitive substance, a layer of heterogeneously arranged substantially uniformly distributed fine closely adjacent particles of a pleochroic material in a substantially single particle thickness which exhibits orange, green and red colors, respectively, to polarized transmitted light according to the particular plane in the substance which is parallel to the plane of vibration of the polarized light, there being provided in the rear of the film between said support and said substance a polarizer adapted to polarize projected light before reaching said material.

7. A device for obtaining multicolor pictures comprising a film having therein a transparent support and, accessible to a beam of transmitted light, both a layer of a light sensitive substance and, in light transmitting relationship to said substance between the support and the light sensitive substance, a layer of heterogeneously arranged substantially uniformly distributed fine closely adjacent particles of a pleochroic material in a substantially single particle thickness which exhibits orange, green and red colors, respectively, to polarized transmitted light according to the particular plane in the substance which is parallel to the plane of vibration of the polarized light, said film having a goffered surface in said support in light focusing relationship to said substance, there being provided in the rear of the film a polarizer adapted to polarize projected light before reaching said material.

ARTHUR WRIGHT.

REFERENCES CITED

The following references are of record in the file of this patent:

UNITED STATES PATENTS

| Number | Name | Date |
|---|---|---|
| 1,885,642 | Strong | Nov. 1, 1932 |
| 2,002,515 | Worrall | May 28, 1935 |
| 2,218,875 | Parsell | Oct. 22, 1940 |
| 2,309,626 | Conrad | Feb. 2, 1943 |